(12) United States Patent
Lin et al.

(10) Patent No.: US 7,702,161 B2
(45) Date of Patent: Apr. 20, 2010

(54) PROGRESSIVE DIFFERENTIAL MOTION JPEG CODEC

(75) Inventors: Hung-Ming Lin, Hsinchu (TW); Hung-Ju Huang, Hsinchu (TW); Ming-Chi Pai, Hsinchu (TW)

(73) Assignee: Aspeed Technology Inc., Hsinchu City (TW)

( * ) Notice: Subject to any disclaimer, the term of this patent is extended or adjusted under 35 U.S.C. 154(b) by 1209 days.

(21) Appl. No.: 11/262,208

(22) Filed: Oct. 28, 2005

(65) Prior Publication Data

US 2006/0050978 A1    Mar. 9, 2006

(51) Int. Cl.
G06K 9/36 (2006.01)
(52) U.S. Cl. ...................................... 382/232; 382/246
(58) Field of Classification Search .................. 382/232; 704/219
See application file for complete search history.

(56) References Cited

U.S. PATENT DOCUMENTS

| | | | | |
|---|---|---|---|---|
| 5,621,466 | A * | 4/1997 | Miyane et al. | 375/240.2 |
| 6,363,119 | B1 * | 3/2002 | Oami | 375/240.03 |
| 7,444,030 | B2 * | 10/2008 | Reid et al. | 382/239 |
| 2003/0006916 | A1 * | 1/2003 | Takamizawa | 341/61 |
| 2006/0088222 | A1 * | 4/2006 | Han et al. | 382/232 |
| 2006/0171456 | A1 * | 8/2006 | Kwon | 375/240.03 |
| 2006/0293884 | A1 * | 12/2006 | Grill et al. | 704/219 |

OTHER PUBLICATIONS

Sanmati Kamath & Joel R. Jackson, "Low-Bit Rate Motion JPEG Using Differential Encoding", IEEE 2004, pp. 11723-11729.*

* cited by examiner

Primary Examiner—Samir A. Ahmed
Assistant Examiner—Mekonen Bekele
(74) Attorney, Agent, or Firm—Muncy, Geissler, Olds & Lowe, PLLC

(57) ABSTRACT

A progressive differential motion JPEG codec is disclosed. The compression encoder of the progressive differential motion JPEG codec comprises a video capture unit, a video capture buffer, a detection unit, a compression unit, and a quality level buffer. The video capture unit is used for receiving an image data and dividing a component of the image data into a plurality of image data blocks. The video capture buffer stores the image data block. The detection unit is electrically coupled to the video capture unit and the video capture buffer for detecting whether a content of the image data block input from the video capture unit is different from a content of the image data block retrieved from the video capture buffer. The compression unit is electrically coupled to the detection unit for compressing the image data block retrieved from the video capture buffer with a predetermined level compression scheme depending on the difference between the content of the image data block input from the video capture unit and the content of the image data block retrieved from the video capture buffer. The quality level buffer assigns and stores an index value indicative of level compression scheme in the quality level buffer when the compression unit compresses the image data block retrieved from the video capture buffer.

16 Claims, 8 Drawing Sheets

PROGRESSIVE DIFFERENTIAL MOTION JPEG CODEC

BACKGROUND OF THE PRESENT INVENTION

1. Field of Invention

The present invention relates to a compression encoder, and more particularly to a progressive differential motion JPEG codec.

2. Description of Related Arts

With the convergence of computers, communications and media, video compression techniques have become increasingly important. Video compression is often used to translate video images (from camera, VCR, laser discs, etc.) into digitally encoded data. The digitally encoded data may then be easily transferred over a network such as the Internet. When desired, the compressed images are then decompressed for viewing on a computer monitor or other such device. Usually it is necessary to compress the digital images due to constraints of limited bandwidth of the Internet for the transmission of compressed digital images and the desire to decrease access or download time of the picture via the Internet. Higher compression of a digital image means that more digital images can be stored on a memory device (such as diskette, hard drive or memory card) and these images can be transferred faster over limited bandwidth transmission lines (such as telephone lines, internet, etc). However, the problem is that it is insufficient to sustain high-quality decomposed images with higher compression of images. Besides, the problem with Internet streaming is that presently there is still relatively low bandwidth available, and thus picture quality tends to be poor. For example, a 1 Mps download capability (e.g., with DSL) limits a consumer's real-time ability to 1 Mps (at best), which is insufficient to sustain high-quality images. As a result, the streaming approach generally provides a much poorer viewing experience. Thus, efficient and effective compression and decompression of images is highly important and desirable.

One of the most popular and widely used techniques of image compression is the Joint Photographic Experts Group (JPEG) standard. The JPEG standard operates by mapping an 8×8 square block of pixels into the frequency domain by using a discrete cosine transform (DCT). Coefficients obtained by the DCT are divided by a scale factor and rounded to the nearest integer (a process known as quantizing) and then mapped to a one-dimensional vector via a fixed zigzag scan pattern. This one-dimensional vector is encoded using a combination of run-length encoding and Huffman encoding.

FIGS. 1A and 1B are a high level block diagram illustrating the basic operations of JPEG in the compression, transmission, and reconstruction of a source image. The source image is represented by one or more components, each of which includes an array of multi-bit pixels. A grayscale image would include a single component while a color image would include up to three components. The operations shown apply to each component.

Data representing a source image data 110 is communicated to a compression encoder 120 to provide compressed image data 160. This data may be stored as a file for subsequent retrieval and reconstruction, or it may be transmitted on some communication medium to a remote location for immediate or subsequent reconstruction. In any event, it is contemplated that the compressed image data 160 will be communicated to a decompression decoder 130 to provide reconstructed image data. The compression encoder 120 uses certain data structures for the compression, and relevant portions of these must be communicated as side information for use by decompression decoder in the image reconstruction. The particular compression technique under discussion contemplates a single set of side information that applies to the entire image component.

In the proposed JPEG standard, the compression encoder 120 includes a discrete cosine transform (DCT) stage 121, a quantizer 122, and a Huffman encoder 123. The decompression decoder 130 includes a Huffman decoder 131, a dequantizer 132, and an inverse discrete cosine transform (IDCT) stage 133. The side information includes a quantization table 140 used by the quantizer 122 or the dequantizer 132 and a set of Huffman code tables 150 used by the Huffman encoder 123 or the Huffman decoder 131.

The image data is divided into blocks of 8 pixels by 8 pixels, and each block is separately processed. Positions within an 8×8 block are denoted by a double subscript, with the first subscript referring to the row and the second subscript referring to the column.

In addition, the source image data could be grayscale image data or color image data. There are a number of ways in which a color image can be broken into components. Standard monitors use the RGB characterization where R, G, and B are the red, green and blue components. Standard television broadcasting (NTSC) uses the YUV characterization where Y is the luminance component and U and V are the chrominance components (approximately red and blue). Printers use the CMYK characterization where C, M, Y, and K are the cyan, magenta, yellow, and black components. The CCIR 601 standard describes a linear transformation between the RGB characterization and the YUV characterization. As shown in FIG. 1A, the source image data 110 are linearly transformed from RGB domain into YUV domain. As shown in FIG. 1B, the decompressed image data are linearly transformed from YUV domain into RGB domain.

Although JPEG is a popular and widely used compression technique, it has several disadvantages. For example, one disadvantage of JPEG is that at low bit rates the DCT produces irregularities and discontinuities in a reconstructed image (known as tiling or blocking artifacts). Blocking artifacts cause the boundary between groups of 8×8 blocks of pixels to become visible in the reconstructed image. These blocking artifacts cause an undesirable degradation in image quality. Another disadvantage of JPEG is that JPEG cannot perform image reconstruction that is progressive in fidelity. In other words, if an image is encoded at a certain fidelity and a lower fidelity is later desired (for example, due to limited bandwidth or storage availability), the image must be decoded and re-encoded.

In order to overcome these shortcomings of JPEG, most modern image compression techniques use a wavelet transform technique followed by a quantization and entropy encoding. Wavelet transform (WT) is preferred over the DCT used in JPEG because WT does not have blocking artifacts and WT allows for image reconstruction that is progressive in resolution. Moreover, WT leads to better energy compaction and thus better distortion/rate performance than the DCT.

Most current WT-based compression techniques decompose an image into coefficients and use some form of entropy encoding (such as adaptive Huffman encoding or arithmetic encoding) of the coefficients to further compress the image. These types of encoding, however, can be quite complex and use, for example, complex symbol tables (such as in adaptive Huffman encoding) or complex data structures (such as zerotree data structures) that depend on the data types. Thus, most current WT-based techniques are complex and difficult to implement.

In order to accomplish a high quality level of decompressed images, lower latency time due to compression procedure, decompression procedure, and network latency, and smooth network loading, the present invention provides a solution for the above needs.

SUMMARY OF THE PRESENT INVENTION

A main object of the present invention is to provide a data compression and decompression apparatus and a method for accomplishing a high quality level of decompressed images, lower latency time due to compression procedure, decompression procedure, and network latency, and smooth network loading.

Another object of the present invention is to provide a data compression and decompression apparatus and a method for employing dual quantization process. The first quantization process implements a lower quality quantization to let quantization coefficients be fast entropy-encoded by the Huffman encoder. Hence the decompression unit could fast reconstruct the compressed video stream and provides a video output. The second quantization process implements a higher quality quantization to compensate the current video output to accomplish higher quality level of decompressed images. The combined compression and decompression technique provides high performance, high image quality, good compression, and is perceptibly lossless. The compression and decompression technique may be used over virtually any wired or wireless communications channel.

Accordingly, in order to accomplish the one or some or all above objects, the present invention provides a compression encoder comprises:

a video capture unit for receiving an image data and dividing a component of the image data into a plurality of image data blocks;

a video capture buffer for storing the image data block;

a detection unit electrically coupled to the video capture unit and the video capture buffer for detecting whether a content of the image data block input from the video capture unit is different from a content of the image data block retrieved from the video capture buffer;

a compression unit electrically coupled to the detection unit for compressing the image data block retrieved from the video capture buffer with a predetermined level compression scheme depending on the difference between the content of the image data block input from the video capture unit and the content of the image data block retrieved from the video capture buffer; and a quality level buffer for assigning and storing an index value indicative of level compression scheme in the quality level buffer when the compression unit compresses the image data block retrieved from the video capture buffer.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

DETAILED DESCRIPTION OF THE PREFERRED EMBODIMENT

Figure 1A:
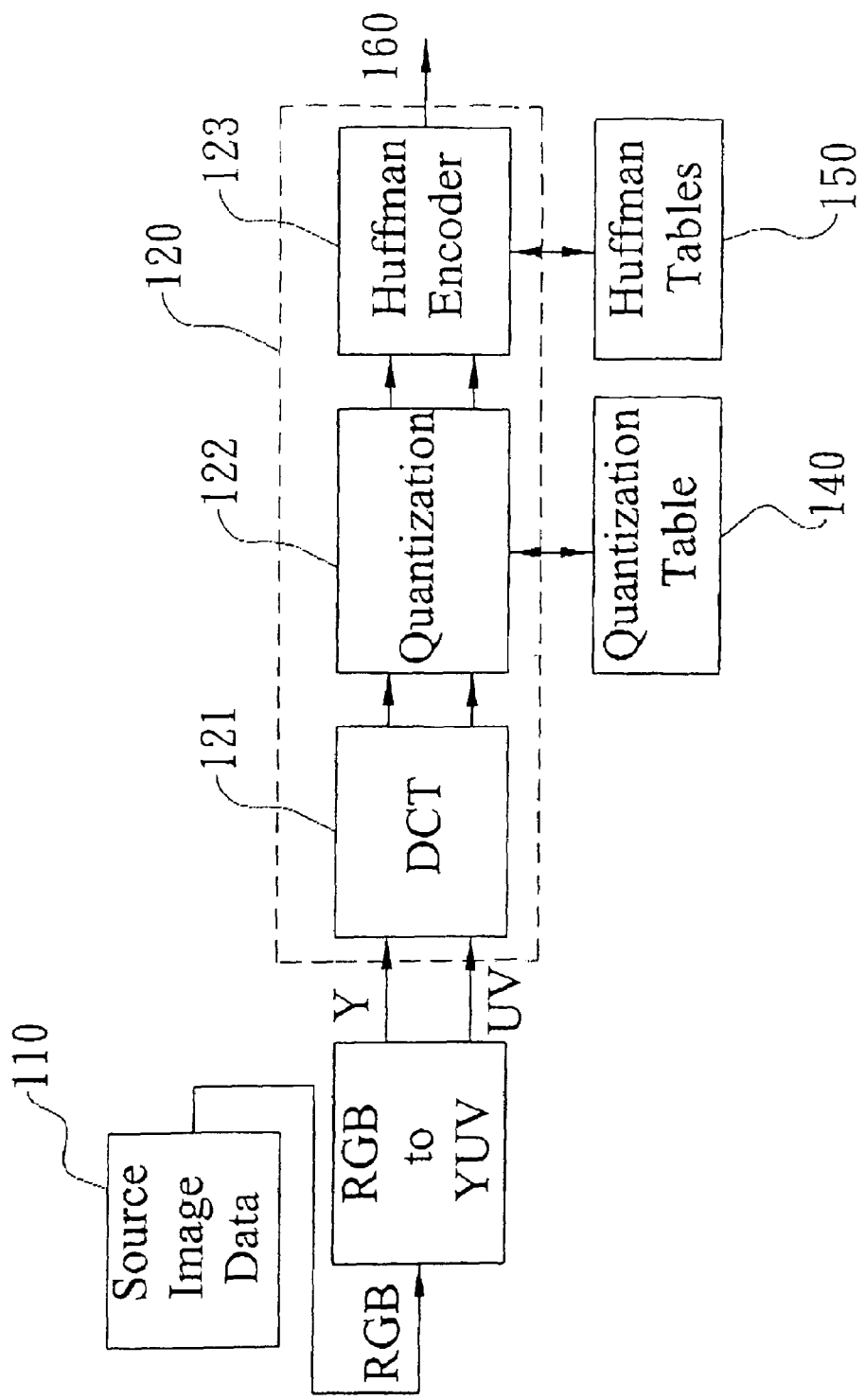
FIGS. 1A and 1B are a high level block diagram illustrating the basic operations of JPEG in the compression, transmission, and reconstruction of a source image.
Figure 1B:
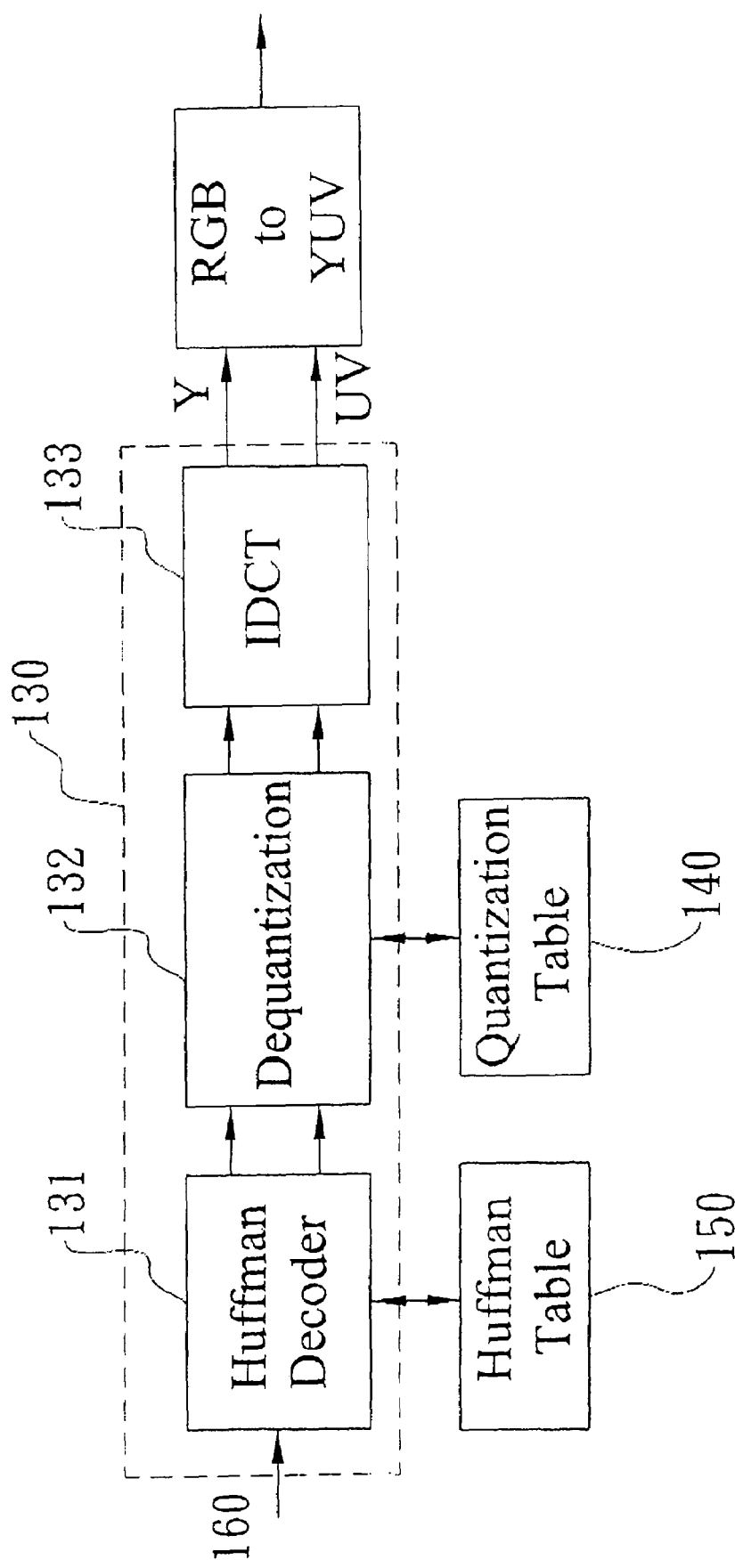
Figure 2A:
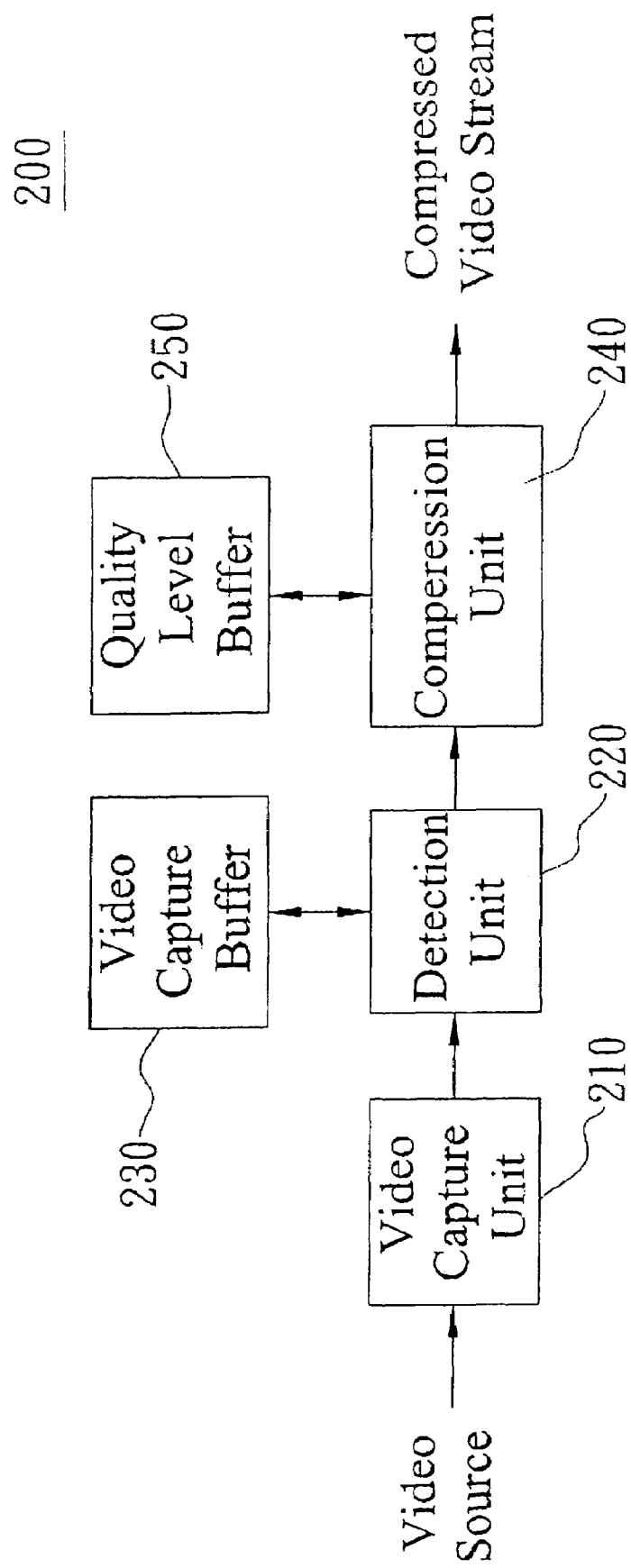
FIG. 2A is a general block diagram of compression encoder according to a preferred embodiment of the present invention.

Referring to FIG. 2A, a general block diagram of compression encoder according to a preferred embodiment of the present invention is illustrated. The compression encoder 200 comprises a video capture unit 201, a detection unit 202, a video capture buffer 203, a compression unit 204, and a quality level buffer 205. Data representing a video source is communicated to a compression encoder 200 to provide a compressed video stream. This compressed video stream may be stored as a file for subsequent retrieval and reconstruction, or it may be transmitted on some communication medium to a remote location for immediate or subsequent reconstruction. In any event, it is contemplated that the compressed video stream will be communicated to a decompression decoder 300 to provide a reconstructed video output. The compression encoder 200 uses the video capture unit 201 to capture the video source to be divided into blocks of m pixels by n pixels and each block is separately processed. Positions within an P×Q block (as shown in FIG. 2C) are denoted by a double subscript, with the first subscript referring to the row and the second subscript referring to the column. Numbering of blocks is from left to right and from top to bottom so that the upper left corner is (0,0), the upper right corner is (0,Q-1), the lower left corner is (P-1,0), and the lower right corner is (P-1,Q-1). At the beginning, data corresponding to block(m, n) is received at the video capture unit 201 and then passed through the detection unit 202 to the video capture buffer 203. Then data corresponding to block(m,n+1) is received at the video capture unit 201. The detection unit 202 receives block (m,n+1) and compares the content of block(m,n+1) with the content of block(m,n) retrieved from the video capture buffer 203. If the input block is detected to be different from the block retrieved from the video capture buffer 203, the compression unit 204 compressed the block retrieved from the video capture buffer 203 and an index value indicative of lower level compression scheme is assigned and stored in the quality level buffer 205. The compression unit 204 outputs the compressed video stream.

Otherwise, if the input block is detected to be no difference with the block retrieved from the video capture buffer 203 and the corresponding index value of the block retrieved from the video capture buffer 203 is indicative of lower level compression scheme, the compression unit 204 compressed the difference data between the content of the input block and a reconstructed data and an index value indicative of higher level compression scheme is assigned and stored in the quality level buffer 205, wherein the reconstructed data is reconstructed from the compressed video stream.

Figure 2B:
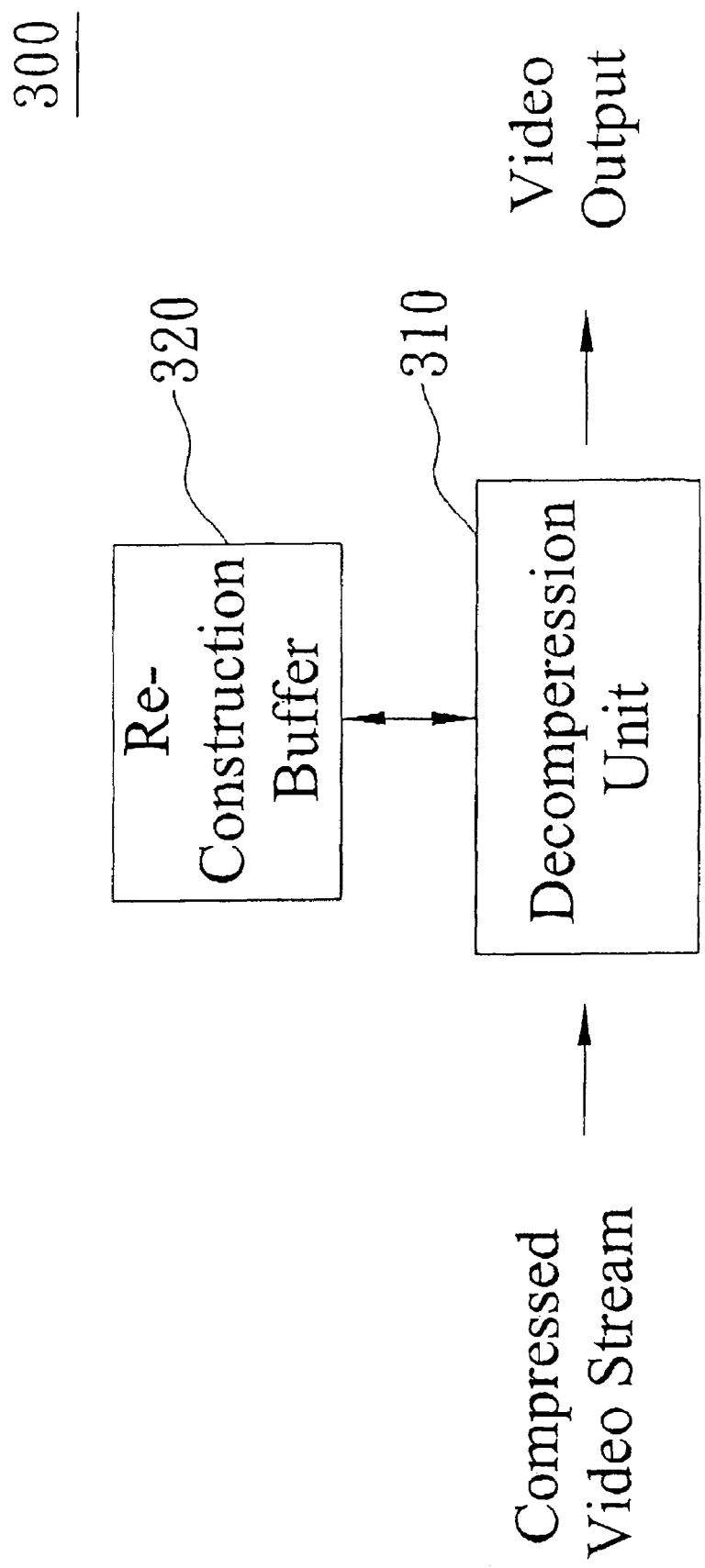
FIG. 2B is a general block diagram of the decompression decoder according to the above preferred embodiment of the present invention.
Figure 2C:
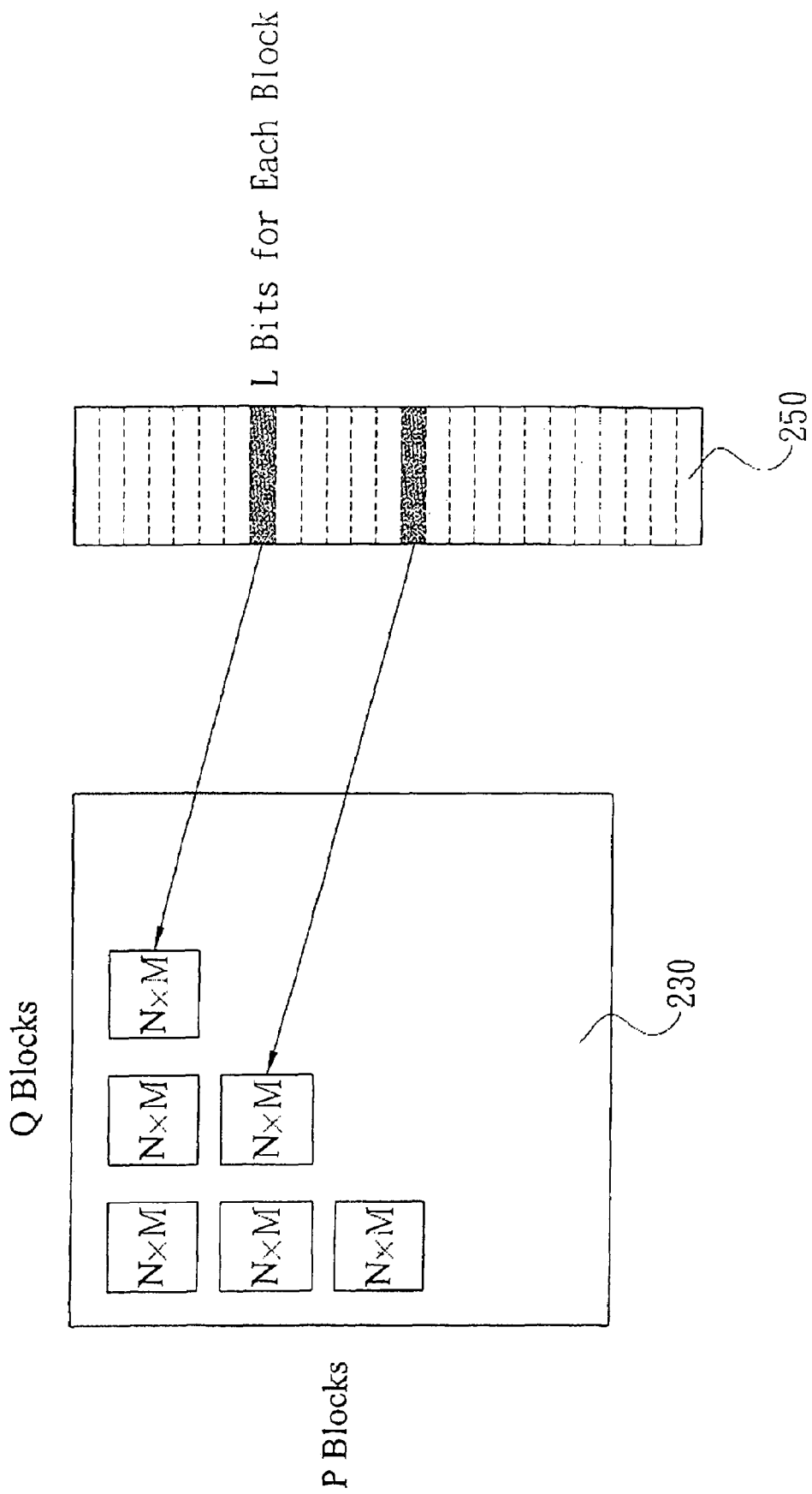
FIG. 2C is a schematic diagram of the video capture buffer and the quality level buffer according to the above preferred embodiment of the present invention.

Referring to FIG. 2B, a general block diagram of decompression decoder according to a preferred embodiment of the present invention is illustrated. The decompression decoder 300 comprises a decompression unit 301 and a reconstruction buffer 302. The decompression unit 301 receives the compressed video stream to reconstruct the compressed video stream and provides a video output. Furthermore, the decompression unit 301 receives the compressed difference data and reconstructs the compressed difference data to generate a compensated data. The compensated data is added to the current video output to accomplish higher quality level of decompressed images.

Figure 3:
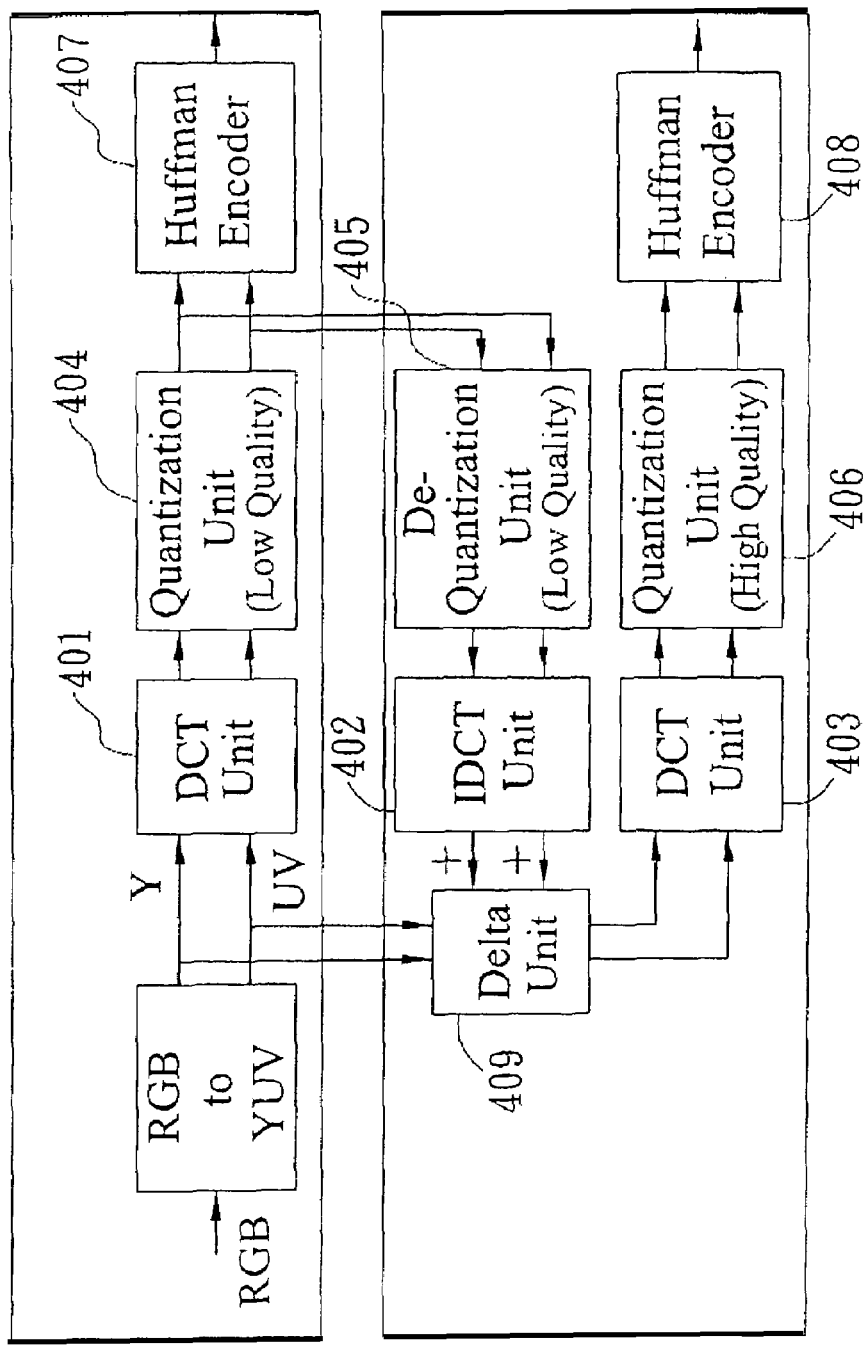
FIG. 3 is a block diagram illustrating one embodiment of compression unit of FIG. 2A.

Referring to FIG. 3, a block diagram illustrating one embodiment of compression unit of FIG. 2A is illustrated. The compression unit comprises a discrete cosine transformation (DCT) unit 401, an inverse discrete cosine transformation (IDCT) unit 402, a discrete cosine transformation (DCT) unit 403, a quantization unit 404, a dequantization unit 405, a quantization unit 406, a Huffman encoder 407, a Huffman encoder 408, and a delta unit 409. The DCT unit 401 receives an image data block and implements a discrete cosine transform (DCT) to generate DCT coefficients. The quantization unit 404 quantizes DCT coefficients output from the DCT unit 401 and implements a low quality quantization. The quantization coefficients are entropy-encoded by the Huffman encoder 407. However, the dequantization unit 405 dequantizes quantization coefficients output from the quantization unit 404 to generate dequantization coefficients. The IDCT unit 402 implements an inverse discrete cosine transform (IDCT). The output of the IDCT operation are M×N blocks. The delta unit 409 receives the original image data block and the reconstructed image data block and implements image transformation and convolution to generate an image data difference between the original image data block and the reconstructed image data block. The DCT unit 403 receives the image data difference and implements a discrete cosine transform (DCT) to generate DCT coefficients. The quantization unit 406 implements a high quality quantization and quantizes DCT coefficients output from the DCT unit 403. The quantization coefficients are entropy-encoded by the Huffman encoder 408.

When the compression scheme described above is applied to colour images, the same scheme as described above could be employed for each colour band separately. However, if the 3 colour bands representing a colour image are others than the YUV colour space, e.g. the RGB (Red Green Blue) colour space, it can be advantageous to perform a transformation to the YUV colour space, where Y is the luminance component and U and V are the chrominance components, since most of the energy of a YUV colour image is concentrated to the Y component, or another suitable colour space.

Figure 4:
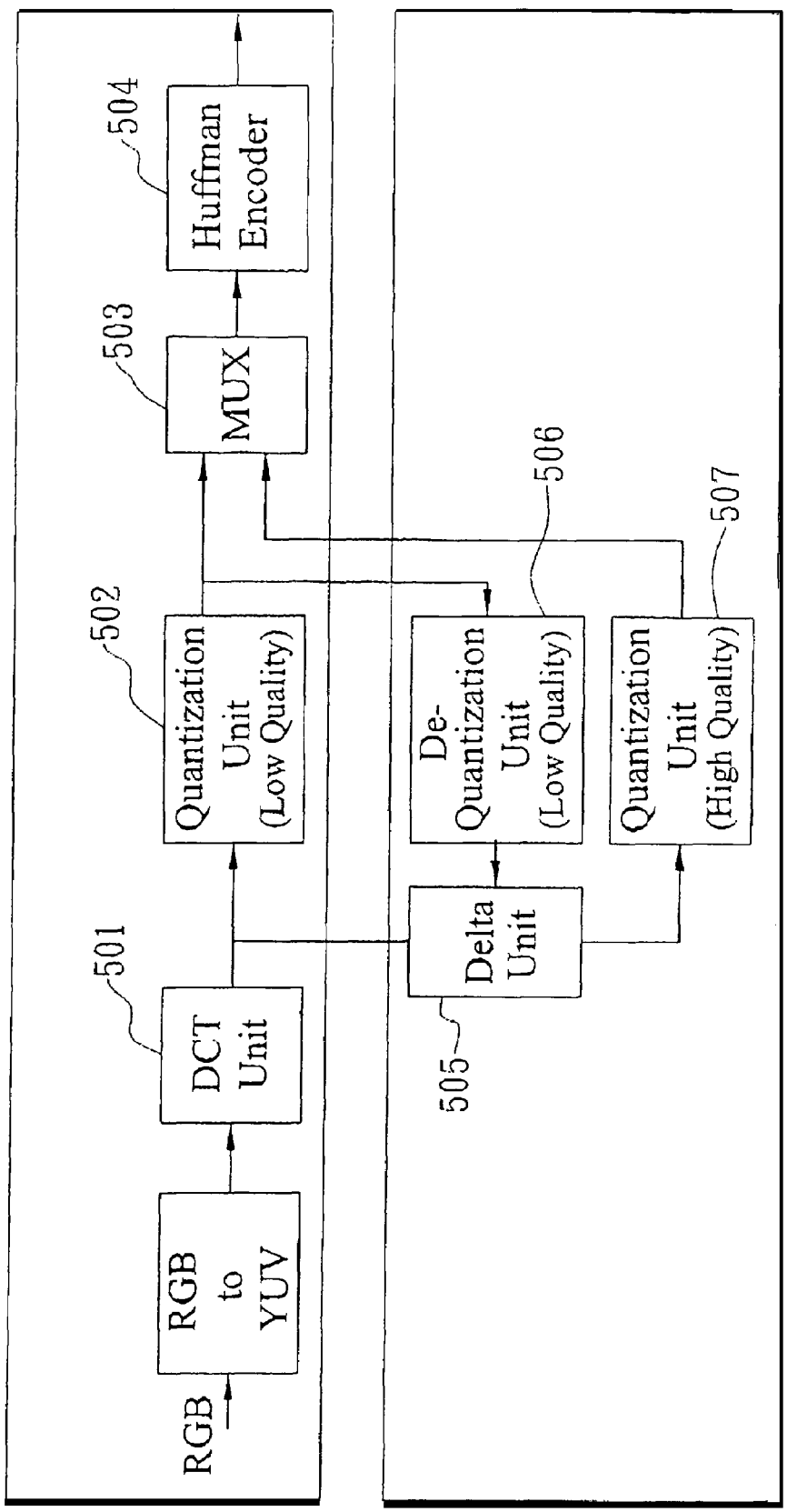
FIG. 4 is a block diagram illustrating another embodiment of compression unit of FIG. 2A.

Referring to FIG. 4, a block diagram illustrating another embodiment of compression unit of FIG. 2A is illustrated. The compression unit comprises a discrete cosine transformation (DCT) unit 501, a quantization unit 502, a multiplexer 503, a Huffman encoder 504, a delta unit 505, a dequantization unit 506, and a quantization unit 507. The discrete cosine transformation (DCT) unit 501 receives an image data block and implements a discrete cosine transform (DCT) to generate DCT coefficients. The quantization unit 502 implements a low quality quantization and quantizes DCT coefficients output from the DCT unit 502. The dequantization unit 506 dequantizes quantization coefficients output from the quantization unit 502 to generate dequantization coefficients. The delta unit 505 receives the quantization coefficients and the dequantization coefficients and implements image transformation and convolution to generate DCT coefficient differences between the quantization coefficients and the dequantization coefficients. The quantization unit 507 implements a high quality quantization and quantizes quantization coefficient differences output from the delta unit 505. The multiplexer 503 transfers the quantization coefficients output from the quantization unit 502 and the quantization coefficient differences output from the quantization unit 507. The quantization coefficients are entropy-encoded by the Huffman encoder 504.

When the compression scheme described above is applied to colour images, the same scheme as described above could be employed for each colour band separately. However, if the 3 colour bands representing a colour image are others than the YUV colour space, e.g. the RGB (Red Green Blue) colour space, it can be advantageous to perform a transformation to the YUV colour space, where Y is the luminance component and U and V are the chrominance components, since most of the energy of a YUV colour image is concentrated to the Y component, or another suitable colour space.

The foregoing description of the preferred embodiment of the present invention utilizes a discrete cosine transformation (DCT) unit to generate DCT coefficients and an inverse discrete cosine transformation (IDCT) unit to implement an inverse discrete cosine transform (IDCT) as an example, however, any transformation unit for generating transformation coefficients such as Wavelet transform could be applied to this invention.

Figure 5:
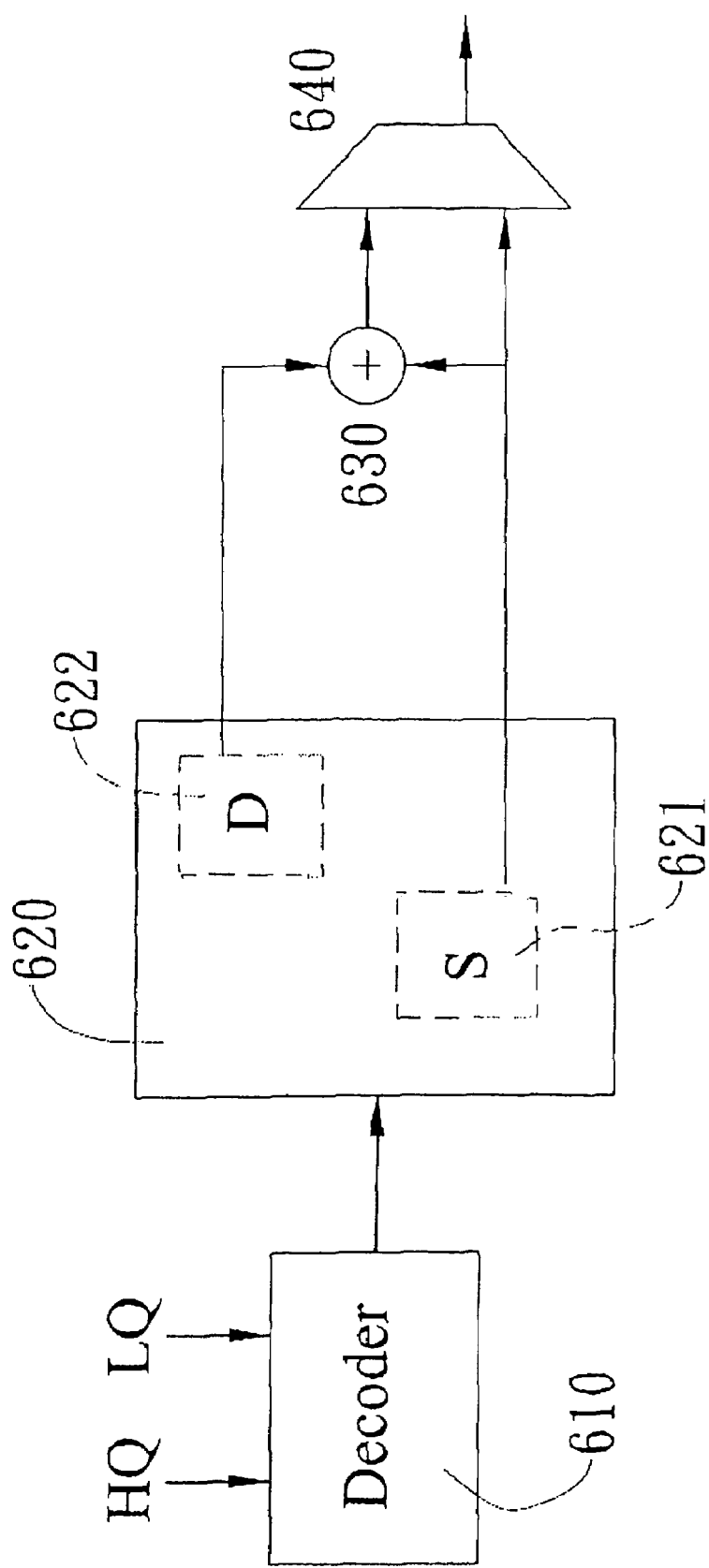
FIG. 5 is a block diagram illustrating one embodiment of decompression decoder of FIG. 2B.

Referring to FIG. 5, a block diagram illustrating one embodiment of decompression decoder of FIG. 2B is illustrated. As shown in FIG. 5, a decoder 601 could receive an encoded low-quality quantization coefficients LQ provided by the Huffman encoder 407 and an encoded high-quality quantization coefficients HQ provided by the Huffman encoder 408. The encoder 601 receives the encoded low-quality quantization coefficients LQ and reconstructs the encoded low-quality quantization coefficients LQ to generate an image output 621. The image output 621 is stored in an image buffer 620. The encoder 601 also receives the encoded high-quality quantization coefficients HQ and reconstructs the encoded high-quality quantization coefficients HQ to generate a compensated data 622. The image output 621 could be directly output through a multiplexer 640. The reconstructed image also could be the sum of the image output 621 and the compensated data 622 through an adder 630.

In conclusion, the present invention provides a data compression and decompression apparatus and a method for employing dual quantization process. The first quantization process implements a lower quality quantization to let quantization coefficients be fast entropy-encoded by the Huffman encoder. Hence the decompression unit could fast reconstruct the compressed video stream and provides a video output. The second quantization process implements a higher quality quantization to compensate the current video output to accomplish higher quality level of decompressed images. The combined compression and decompression technique provides a high quality level of decompressed images, lower latency time due to compression procedure, decompression procedure, and network latency, and smooth network loading.

The compression and decompression technique may be used over virtually any wired or wireless communications channel.

One skilled in the art will understand that the embodiment of the present invention as shown in the drawings and described above is exemplary only and not intended to be limited.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. In a compression unit of a compression encoder comprising a video capture unit for receiving an image data and dividing a component of said image data into a plurality of image data blocks, a method of image compression comprising the steps of:
    implementing a first transformation on each said image data block to generate first transformation coefficients by means of a first transformation unit;
    implementing a low quality quantization of said first transformation coefficients by means of a first quantization unit;
    entropy-encoding said low quality quantization of said first transformation coefficients by means of a first Huffman encoder;
    dequantizing said low quality quantization of said first transformation coefficients by means of a dequantization unit;
    implementing an inverse transformation of said dequantization of said first transformation coefficients to generate a reconstructed image data block by means of an inverse transformation unit;
    implementing image transformation and convolution to generate an image data difference between said image data block and said reconstructed image data block by means of a delta unit;
    implementing a second transformation on said image data difference to generate a second transformation coefficients by means of a second transformation unit;
    implementing a high quality quantization of said second transformation coefficients by means of a second quantization unit; and
    entropy-encoding said high quality quantization of said second transformation coefficients by means of a second Huffman encoder.

2. The method, as recited in claim 1, wherein said first and second transformation coefficients are entropy-encoded and quantized to conform to said JPEG standard.

3. The method, as recited in claim 1, wherein said image data is a red, green, blue ("RGB") color space format.

4. The method, as recited in claim 3, wherein said image data in a red, green, blue ("RGB") color space format is transformed into a YUV color space format.

5. The method, as recited in claim 1, wherein said first transformation is one of a discrete cosine transform (DCT) and a Wavelet transform.

6. The method, as recited in claim 1, wherein said second transformation is one of a discrete cosine transform (DCT) and a Wavelet transform.

7. The method, as recited in claim 1, wherein said first transformation coefficients are one of discrete cosine transform (DCT) coefficients and Wavelet transform coefficients.

8. The method, as recited in claim 1, wherein said second transformation coefficients are one of discrete cosine transform (DCT) coefficients and Wavelet transform coefficients.

9. The method, as recited in claim 1, wherein said inverse transformation is an inverse discrete cosine transformation (IDCT).

10. In a compression unit of a compression encoder comprising a video capture unit for receiving an image data and dividing a component of said image data into a plurality of image data blocks, a method of image compression comprising the steps of:
    implementing a transformation on each said image data block to generate transformation coefficients by means of a transformation unit;
    implementing a low quality quantization of said transformation coefficients by means of a quantization unit;
    dequantizing said low quality quantization of said transformation coefficients by means of a dequantization unit;
    implementing image transformation and convolution to generate transformation coefficient differences between said quantization coefficients and said dequantization coefficients by means of a delta unit;
    implementing a high quality quantization of said transformation coefficient differences by means of a quantization unit;
    multiplexing of said high quality quantization of said transformation coefficient differences and said low quality quantization of said transformation coefficients by means of a multiplexer; and
    entropy-encoding an output of said multiplexing by means of a Huffman encoder.

11. The method, as recited in claim 10, wherein said first and second transformation coefficients are entropy-encoded and quantized to conform to said JPEG standard.

12. The method, as recited in claim 10, wherein said image data is a red, green, blue ("RGB") color space format.

13. The method, as recited in claim 12, wherein said image data in a red, green, blue ("RGB") color space format is transformed into a YUV color space format.

14. The method, as recited in claim 10, wherein said transformation is one of a discrete cosine transform (DCT) and a Wavelet transform.

15. The method, as recited in claim 10, wherein said transformation coefficients are one of discrete cosine transform (DCT) coefficients and Wavelet transform coefficients.

16. The method, as recited in claim 10, wherein said transformation coefficient differences are one of discrete cosine transform (DCT) coefficient difference and Wavelet transform coefficient difference.

* * * * *